US012330692B2

(12) United States Patent
Yang et al.

(10) Patent No.: US 12,330,692 B2
(45) Date of Patent: Jun. 17, 2025

(54) ROUTE PLANNING SYSTEM AND METHOD OF SELF-DRIVING VEHICLE

(71) Applicant: Automotive Research & Testing Center, Lugang (TW)

(72) Inventors: Ji-Fan Yang, Lugang (TW); Tsung-Ming Hsu, Lugang (TW); Shou-Ti Cheng, Lugang (TW)

(73) Assignee: AUTOMOTIVE RESEARCH & TESTING CENTER, Lugang (TW)

( * ) Notice: Subject to any disclaimer, the term of this patent is extended or adjusted under 35 U.S.C. 154(b) by 288 days.

(21) Appl. No.: 18/089,089

(22) Filed: Dec. 27, 2022

(65) Prior Publication Data

US 2024/0208547 A1 Jun. 27, 2024

(51) Int. Cl.
*B60W 60/00* (2020.01)
*B60W 50/00* (2006.01)
(Continued)

(52) U.S. Cl.
CPC .... *B60W 60/0027* (2020.02); *B60W 50/0097* (2013.01); *G01S 7/4802* (2013.01); *G01S 17/89* (2013.01); *B60W 2420/408* (2024.01); *B60W 2552/53* (2020.02); *B60W 2554/404* (2020.02)

(58) Field of Classification Search
CPC ......... B60W 60/0027; B60W 50/0097; B60W 2420/408; B60W 2552/53;
(Continued)

(56) References Cited

U.S. PATENT DOCUMENTS 11,656,629 B1 * 5/2023 Armstrong-Crews ....................... G01S 17/88
701/25
2018/0178785 A1 * 6/2018 Lin ....................... G06V 10/754
(Continued)

FOREIGN PATENT DOCUMENTS

DE 102019111725 A1 * 11/2019 ............. G06T 7/248
KR 20180040020 A * 4/2018

OTHER PUBLICATIONS

H. Cui et al., "Deep Kinematic Models for Kinematically Feasible Vehicle Trajectory Predictions," 2020 IEEE International Conference on Robotics and Automation (ICRA), Paris, France, 2020, pp. 10563-10569, doi: 10.1109/ICRA40945.2020.9197560. (Year: 2020).*

(Continued)

*Primary Examiner* — Peter D Nolan
*Assistant Examiner* — Preston Jay Miller
(74) *Attorney, Agent, or Firm* — Birch, Stewart, Kolasch & Birch, LLP

(57) ABSTRACT

A self-driving vehicle route planning system detects and transforms environment information of a host vehicle into an aerial view including the coordinate information of coordinate points to recognize and mark traffic lane boundaries, traffic lanes, and other vehicles therein, calculates central points of the traffic lanes, and then, calculates a speed of a front vehicle according to its positions and works out a predicted route thereof. If the predicted route is the same as a driving route of the host vehicle, the front vehicle is used as a route reference point to calculate a final route of the host (Continued)

vehicle; if not, the traffic lane boundary is used as a route reference line to calculate the final route. The invention can plan the route merely using a point cloud data, greatly reducing the cost HD map information and storage space.

18 Claims, 9 Drawing Sheets

(51) Int. Cl.
  *G01S 7/48* (2006.01)
  *G01S 17/89* (2020.01)
(58) Field of Classification Search
  CPC ............ B60W 2554/404; G01S 7/4802; G01S 17/89; G01S 17/931
  USPC .......................................................... 701/25
  See application file for complete search history.

(56) References Cited

U.S. PATENT DOCUMENTS

| | | | | |
|---|---|---|---|---|
| 2019/0033459 A1* | 1/2019 | Tisdale | ................ | G06V 10/751 |
| 2019/0147253 A1* | 5/2019 | Bai | ...................... | G01S 17/931 382/103 |
| 2020/0207342 A1* | 7/2020 | Hsu | ................... | B60W 50/0097 |
| 2020/0218907 A1* | 7/2020 | Baik | ....................... | G06F 17/16 |
| 2020/0250439 A1* | 8/2020 | Vig | ....................... | G05D 1/0246 |
| 2021/0199806 A1* | 7/2021 | Watson | ................... | G01S 17/89 |
| 2021/0201569 A1* | 7/2021 | Marschner | ............. | G01S 17/89 |
| 2022/0315044 A1* | 10/2022 | Tamura | .............. | B60W 60/005 |
| 2023/0271607 A1* | 8/2023 | Kobashi | .................. | G01S 17/89 701/41 |
| 2024/0140441 A1* | 5/2024 | Casselgren | ............... | G06T 7/13 |

OTHER PUBLICATIONS

E. G. Parmehr, C. S. Fraser and C. Zhang, "Automatic Parameter Selection for Intensity-Based Registration of Imagery to LiDAR Data," in IEEE Transactions on Geoscience and Remote Sensing, vol. 54, No. 12, pp. 7032-7043, Dec. 2016, doi: 10.1109/TGRS.2016.2594294. (Year: 2016).*
English Translation of DE-102019111725-A1 (Year: 2019).*
English Translation of KR-20180040020-A (Year: 2018).*
Hata et al. "Road Marking Detection Using LIDAR Reflective Intensity Data and its Application to Vehicle Localization", IEEE (Year: 2014).*

* cited by examiner

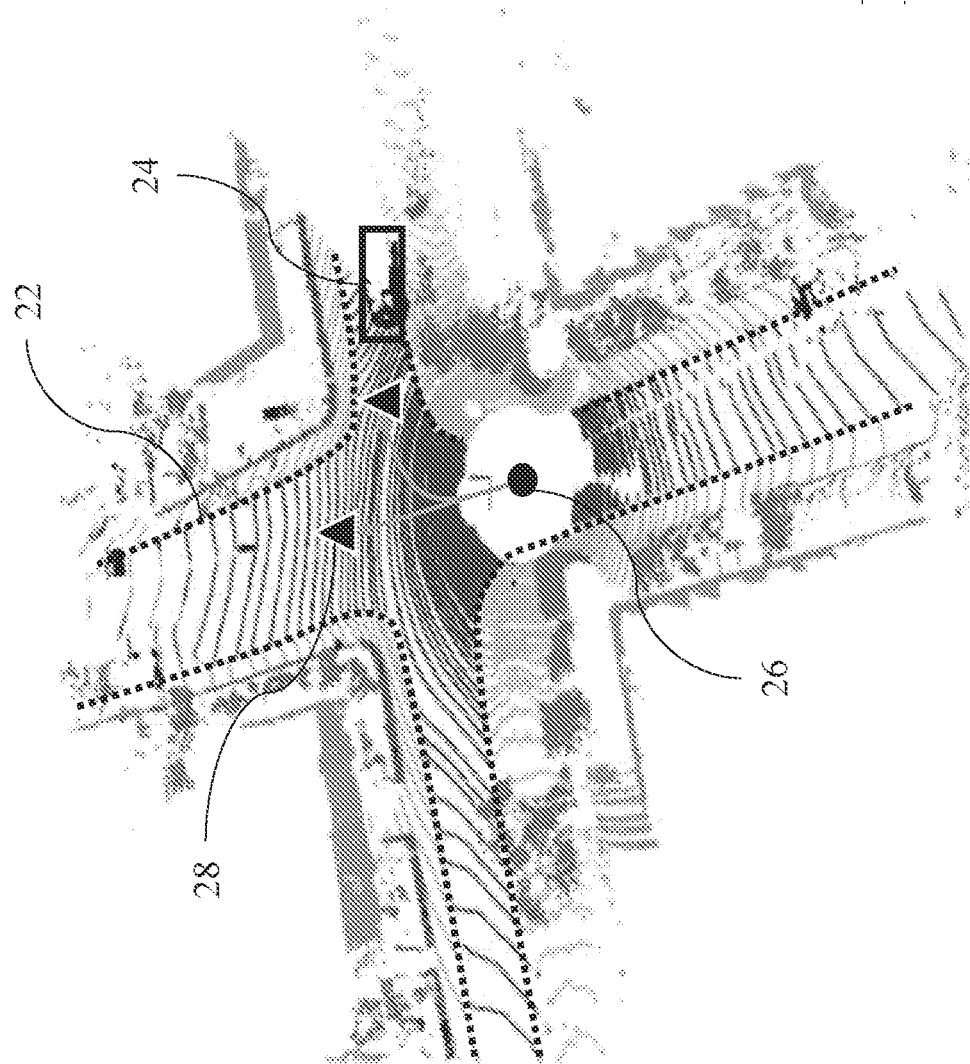

ROUTE PLANNING SYSTEM AND METHOD OF SELF-DRIVING VEHICLE

BACKGROUND OF THE INVENTION

Field of the Invention

The present invention relates to a route planning system, particularly a route planning system and method of a self-driving vehicle.

Description of the Prior Art

The self-driving vehicle technology is growing mature, and the related open-source self-driving software programs are put on the market in succession. At present, mainstream self-driving vehicle technologies mainly use GPS-based high-definition map information or traffic lane marking detection to obtain an optimized route.

The method of using traffic lane marking detection to obtain an optimized route has a big problem: traffic lane markings do not necessarily exist in all environments. For example, there is no traffic lane marking in intersections or parking areas. Traffic lane marking detection will fail in the places where no traffic lane marking appears. Therefore, the method of using traffic lane marking detection to obtain an optimized route is limited by the environment.

In the method of using the high-definition map information to obtain an optimized route, the vehicle is equipped with stereo cameras to collect complete road information to recognize road features and assist in positioning the vehicle, wherein the road features include buildings, traffic signs, road lamps, and road markings (such as traffic lane markings, arrows, directional arrows, and pedestrian crosswalks). The cooperation of the road information and the GPS positioning data can generate accurate images of the route. However, the method cannot work if positioning fails. For example, there is no traffic lane markings for detection while the vehicle is in an intersection. Thus, it is unlikely to plan the route in such a situation. Besides, much manpower and money is required to acquire the map information, and the data volume thereof is very massive. Therefore, the cost of the high-definition map information is very high.

Accordingly, the present invention proposes a route planning system and method of a self-driving vehicle to overcome the abovementioned problems and meet future requirements. The technical contents and embodiments of the present invention will be described in detail below.

SUMMARY OF THE INVENTION

The primary objective of the present invention is to provide a route planning system and method of a self-driving vehicle, which does not depend on the high-definition map information but uses the intensities of the return waves to recognize the objects in the environment, whereby to decrease the manpower and money spent in building the high-definition map information and reduce the storage space occupied by the data.

Another objective of the present invention is to provide a route planning system and method of a self-driving vehicle, which does not rely on the navigation system but can still plan the route via using lidar to perform physical detection while the navigation system fails to work.

Yet another objective of the present invention is to provide a route planning system and method of a self-driving vehicle, which can recognize the boundaries of the road according to the environmental features in the case that there is no traffic lane markings on the road or intersection, whereby to find out the central points of the traffic lane and plan the route of the vehicle, wherefore the safety is significantly enhanced.

In order to achieve the abovementioned objectives, the present invention provides a route planning system of a self-driving vehicle, which is installed in a host vehicle and comprises at least one sensor, used to detect the environment of the host vehicle; an aerial view generation module, connected with the sensor to receive the environment information and convert the environment information into an aerial view that includes the coordinate information of each coordinate point; a feature recognition module, connected with the aerial view generation module to recognize and designate the traffic lane boundaries, the traffic lane markings, and the front vehicle according to the coordinate information; a lane center calculation module, connected with the feature recognition module, working out lane center points according to the traffic lane boundaries and the traffic lane markings, which have been designated on the aerial view, and finding out a front vehicle according to the lane centers and the position of the host vehicle, calculating the speed of the front vehicle according to the position of the front vehicle; a front vehicle prediction module, connected with the feature recognition module and the lane center calculation module, and working out a predicted route of the front vehicle according to a vehicular kinematics model; and a route planning module, connected with the front vehicle prediction module, and planning the final route of the host vehicle via using the front vehicle as a route reference point if the predicted route of the front vehicle is the same as the driving route of the host vehicle or via using the traffic lane boundary as a route reference line if the predicted route of the front vehicle is different from the driving route of the host vehicle or if there is no front vehicle.

In one embodiment, the sensor is a lidar; the sensor presents the environment information of the host vehicle in a point cloud image; the aerial view generation module uses an axis-rotation equation to convert the point cloud image into an aerial view.

In one embodiment, the coordinate information includes the coordinate values of the coordinate points, the shapes formed by the coordinate points, the density distributions of points, the heights of the objects formed by the coordinate points, or the intensity values of the return waves of the coordinate points.

In one embodiment, the intensity values of the return waves are set to have a plurality of ranges in advance; the coordinate points in different ranges of the intensity values of the return waves are presented with different colors in the aerial view.

In one embodiment, the feature recognition module performs a filtering operation on the coordinate information to filter out noise signals and recognizes the traffic lane boundaries, traffic lane markings, and the front vehicle in the aerial view according to the coordinate information.

In one embodiment, the feature recognition module uses a Kalman filter to perform a filtering operation on the coordinate information.

In one embodiment, the lane center calculation module finds out a driving-allowed region according to the traffic lane boundaries and the traffic lane markings in the aerial view and takes the central point of two neighboring traffic lane markings as the lane center or takes the average of the traffic lane boundaries and the traffic lane markings as the lane center.

In one embodiment, after acquiring the position of the front vehicle, which is designated on the aerial view, the lane center calculation module works out the speed of the front vehicle according to the positions of the front vehicle in at least two successive aerial views.

In one embodiment, the front vehicle prediction module establishes a region of interest (ROI) of driving behaviors and predicts the behaviors of the front vehicle, including going straight or turning, according to the ROI of driving behaviors and the predicted route.

In one embodiment, while the predicted route of the front vehicle is the same as the driving route of the host vehicle, the route planning module takes the front vehicle as a route reference point and combines the position of the host vehicle, the lane center, and the speed of the front vehicle to calculate the final route of the host vehicle.

In one embodiment, while the predicted route of the front vehicle is different from the driving route of the host vehicle, the route planning module takes the traffic lane boundary as a route reference line; next, the route planning module uses the route reference line to calculate a boundary curvature and then work out the final route of the host vehicle.

The present invention also provides a route planning method of a self-driving vehicle, which comprises steps: using at least one sensor to detect the environment information of the host vehicle; converting the environment information into an aerial view, wherein the aerial view includes the coordinate information of each coordinate point; recognizing the traffic lane boundaries, the traffic lane markings, and other vehicles in the aerial view according to the coordinate information and designating them on the aerial view; calculating a lane center according to the traffic lane boundaries and the traffic lane markings, which have been designated on the aerial view, finding out a front vehicle from other vehicles according to the lane center and the position of the host vehicle, and calculating the speed of the front vehicle according to the designated positions of the front vehicle; working out a predicted route of the front vehicle according to a vehicular kinematics model; and calculating the final route of the host vehicle via taking the front vehicle as a route reference point if the predicted route of the front vehicle is the same as the driving route of the host vehicle, or via taking the traffic lane boundary as a route reference line if the predicted route of the front vehicle is different from the driving route of the host vehicle or if there is no front vehicle.

In one embodiment, the step of calculating the speed of the front vehicle according to the designated positions of the front vehicle further includes a step of calculating the speed of the front vehicle according to the positions of the front vehicle in at least two successive aerial views.

In one embodiment, the step of working out a predicted route of the front vehicle according to a vehicular kinematics model further includes steps: establishing an ROI of driving behaviors; and predicting the behaviors of the front vehicle, including going straight or turning, according to the ROI of driving behaviors and the predicted route.

BRIEF DESCRIPTION OF THE DRAWINGS

FIGS. 7-9 schematically shows an embodiment where the present invention is used in an intersection.

DETAILED DESCRIPTION OF THE INVENTION

The technical schemes of the embodiments of the present invention will be described clearly and fully in cooperation with the attached drawings. Obviously, the embodiments described in the specification are not all the embodiments of the present invention but only a portion of the embodiments of the present invention. The other embodiments made by the persons skilled in the art according to the technical thoughts of the present invention are regarded as not contributing non-obviousness and are to be also included by the scope of the present invention.

It should be understood: in the specification and claims, the terms "comprise" and "include" indicate the existence of the described characteristics, entirety, steps, operations, elements and/or members. However, the terms "comprise" and "include" do not exclude the existence or addition of one or a plurality of characteristics, entirety, steps, operations, elements, members and/or the combinations thereof.

It should be also understood: the terms used in the specification of the present invention are only to describe specified embodiments but not to limit the scope of the present invention. While used in the specification and claims of the present invention, the singular noun, which is described by "one", "one piece of" or "the", implies the plural form thereof unless the context indicates another condition clearly.

It should be further understood: the term "and/or" used in the specification and claims of the present invention refers to one or several of the listed items or any possible combination of the listed items, and the present invention includes these combinations.

Figure 1:
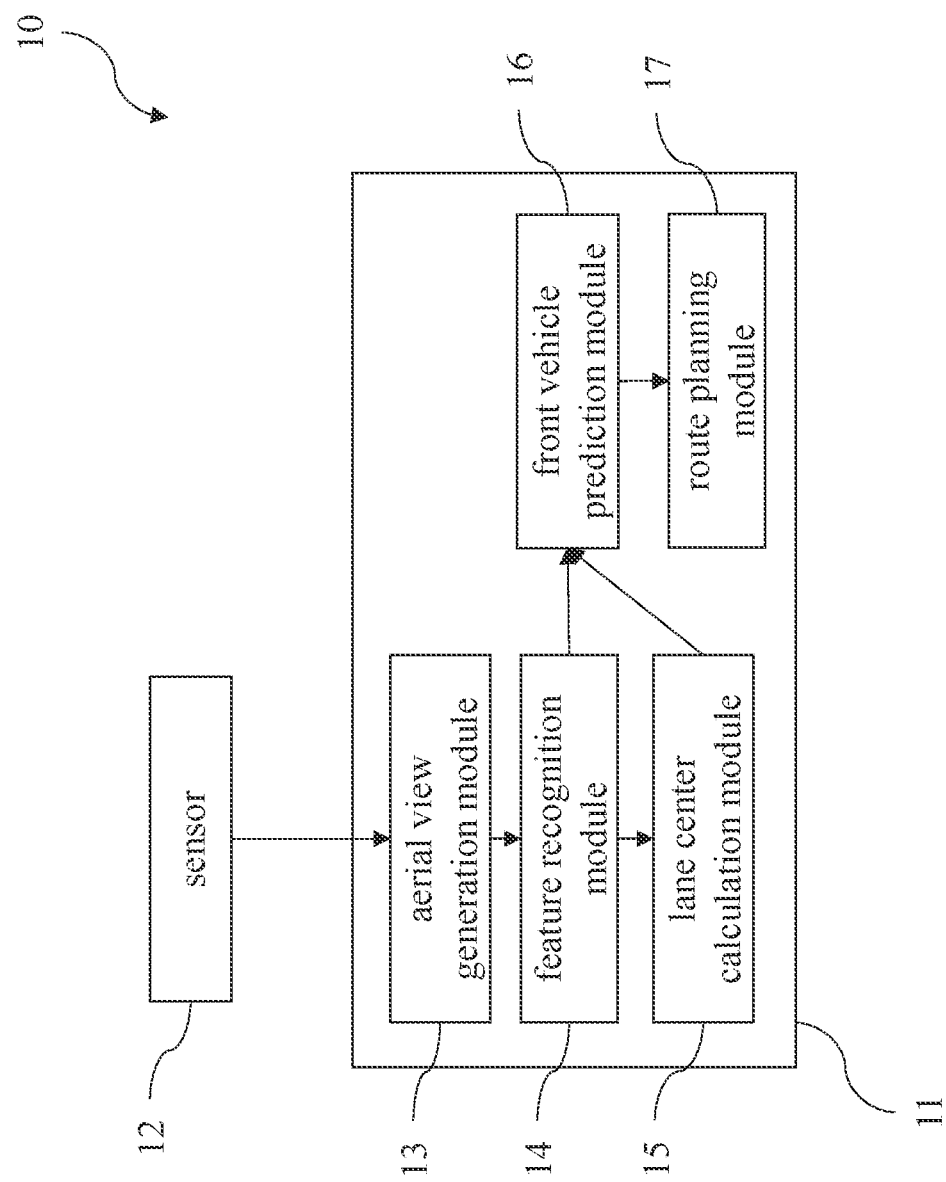
FIG. 1 is a block diagram schematically showing a route planning system of a self-driving vehicle according to one embodiment of the present invention.

Refer to FIG. 1, which shows an architecture of a route planning system of a self-driving vehicle according to one embodiment of the present invention. The route planning system 10 of a self-driving vehicle is installed in a host vehicle (not shown in the drawing). The route planning system 10 of a self-driving vehicle comprises at least one sensor 12, an aerial view generation module 13, a feature recognition module 14, a lane center calculation module 15, a front vehicle prediction module 16, and a route planning module 17. The sensor 12 is connected with the aerial view generation module 13; the aerial generation module 13 is connected with the feature recognition module 14; the feature recognition module 14 is connected with the lane center calculation module 15 and the front vehicle prediction module 16; the lane center calculation module 15 is connected with the front vehicle prediction module 16; the front vehicle prediction module 16 is connected with the route planning module 17. The abovementioned modules are disposed in a vehicular host computer 11. The vehicular host computer 11 includes at least one processor (not shown in the drawing). The abovementioned modules may be realized by one or more processors.

The sensor 12 is installed in the host vehicle to detect the environment of the host vehicle. In one embodiment, the sensor is a lidar, picking up the data of the point cloud of the environment and generating a point cloud image. The aerial view generation module 13 uses an axis-rotation equation to convert the point cloud image into an aerial view, wherein the aerial view includes the coordinate information of each coordinate point; the coordinate information further includes the coordinate values of the coordinate points, the shapes formed by the coordinate points, the density distributions of points, the heights of the objects formed by the coordinate points, or the intensity values of the return waves of the coordinate points. The sensor 12 may filter out specified information. Therefore, the sensor 12 may be used to determine whether there a front vehicle.

In one embodiment, the sensor 12 is a lidar; the return waves, which are received by the lidar to generate point clouds, will have different intensities according to the materials, colors, etc. of the objects. Therefore, the traffic lane boundaries, the traffic lane markings, and the front vehicle may be recognized according to the intensity values of the return waves. In detail, the intensity values of the return waves may be divided into a plurality of ranges in advance; the coordinate points in different ranges of the intensity values of the return waves are presented with different colors in the aerial view. For example, if the intensity values of the return waves of objects are in the ranges of a-b, the objects are coatings having special colors; if the abovementioned objects further have the features of small heights and long-stripped shapes, the objects are determined to be traffic lane boundaries or the traffic lane markings. For another example, if the intensity values of the return waves of objects are in the ranges of c-d, the objects are made of metals; if the abovementioned objects further have the features of medium to large heights and cubic shapes, the objects are determined to be vehicles. For a further example, if the intensity values of the return waves of objects are in the ranges of e-f, the objects are vegetation or made of concrete; if the abovementioned objects further have the features of medium to large heights and irregular shapes, the objects are determined to be shrubs or sidewalks. The recognition is performed by the feature recognition module 14.

The feature recognition module 14 recognizes the traffic lane markings, the traffic lane boundaries, and all the vehicles according to the coordinate information and designates them on the aerial view. For example, the feature recognition module 14 depicts the traffic lane markings and the traffic lane boundaries and labels all the vehicles, including the host vehicle, the front vehicle, and other vehicles, on the aerial view. If the sensor 12 is a lidar, the feature recognition module 14 uses the Kalman filter to perform a filtering operation to filter out noise signals beforehand and then recognizes the traffic lane markings, the traffic lane boundaries, and all the vehicles.

The lane center calculation module 15 performs computation on the traffic lane markings and the traffic lane boundaries, which have been designated on the aerial view, to work out a lane center. Firstly, the lane center calculation module 15 finds out a driving-allowed region in the aerial view. Next, the lane center calculation module 15 takes the central point of two neighboring traffic lane markings in the driving-allowed region as a lane center. Alternatively, the lane center calculation module 15 takes the average of the traffic lane markings and the traffic lane boundaries as a lane center. A plurality of lane centers may be connected to form a central line of the traffic lane markings. The system has known or recognized which one is the host vehicle among the designated vehicles. In the case that the lane centers have been known, the system can further learn which one is the front vehicle. Further, after acquiring the positions of the front vehicle, the lane center calculation module 15 can work out the speed of the front vehicle according to the positions of the front vehicle in at least two successive aerial views. Therefore, the lane center calculation module 15 may output the driving-allowed region, the lane centers, the position of the front vehicle, the speed of the front vehicle, etc.

After acquiring the position of the front vehicle from the aerial view, the front vehicle prediction module 16 can work out a predicted route of the front vehicle using a vehicular kinematics model, suppose that the front vehicle runs at a constant speed. The front vehicle prediction module 16 further establishes a region of interest (ROI) of driving behaviors with the designated traffic lane markings and then predicts the behavior of the front vehicle, which will occur t seconds later, including going straight or turning. Therefore, the front vehicle prediction module 16 can output the predicted behavior of the front vehicle.

The route planning module 17 determines whether the driving route of the front vehicle is the same as that of the host vehicle according to the predicted route and predicted behavior of the front vehicle. If the predicted route of the front vehicle is the same as the driving route of the host vehicle (for example, both the front vehicle and the host vehicle are going to turn right), the route planning module 17 takes the route of the front vehicle as a reference. In other words, the front vehicle is taken as a reference point of the route. The route planning module 17 can work out a route equation of the final route of the host vehicle via jointly using the positions of the host vehicle, the front vehicle, and the lane center. If the predicted route of the front vehicle is different from the driving route of the host vehicle, the route planning module 17 takes the traffic lane boundary most close to the host vehicle as a reference line of the route to work out a final route of the host vehicle.

Figure 2:
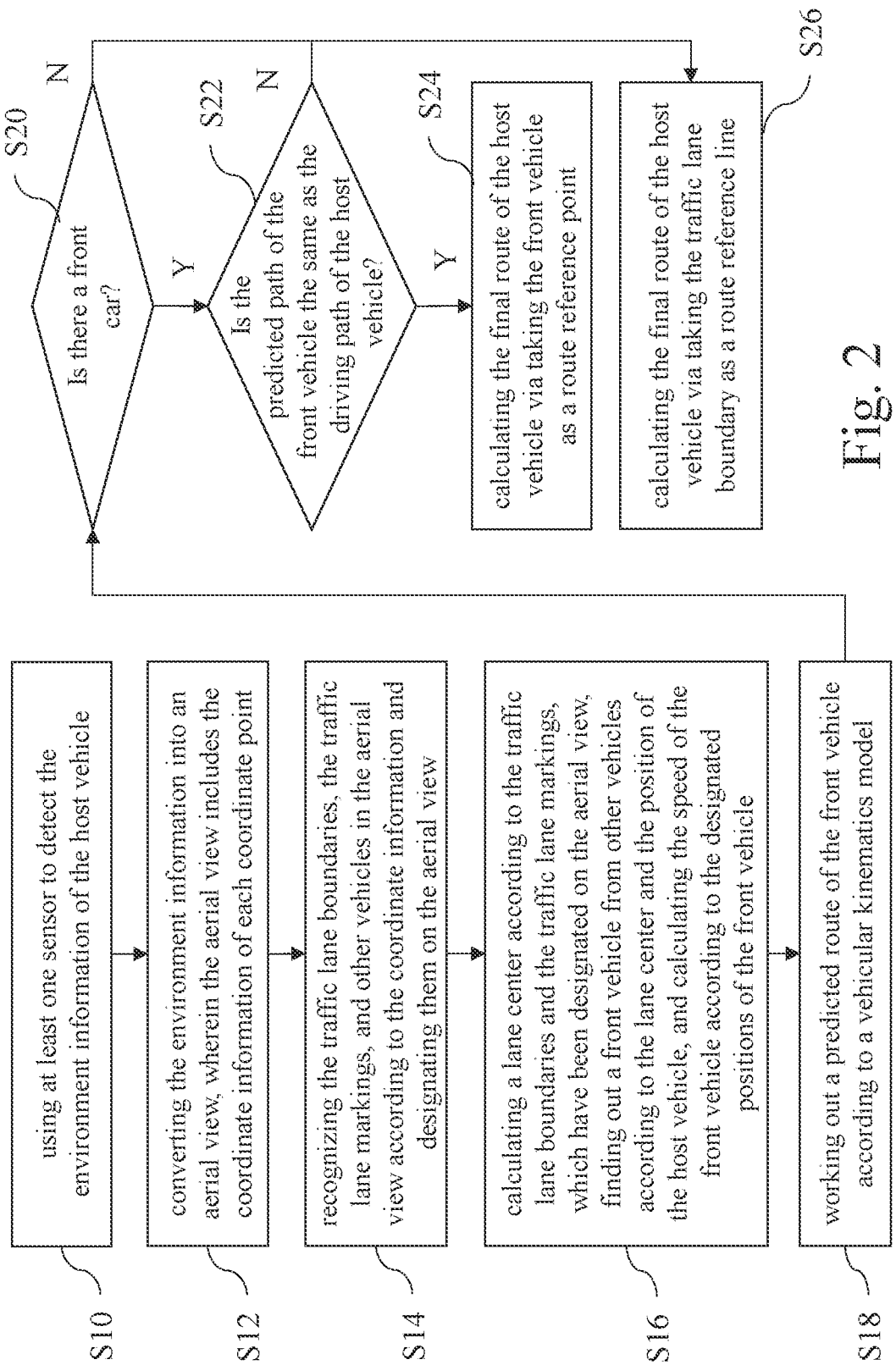
FIG. 2 is a flowchart a route planning method of a self-driving vehicle according to one embodiment of the present invention.

Refer to FIG. 2, which is a flowchart of a route planning method of a self-driving vehicle according to one embodiment of the present invention. In Step S10, use at least one sensor 12 to detect the environment of a host vehicle. In Step S12, an aerial view generation module 13 converts the environment information into an aerial view, wherein the aerial view includes the coordinate information of each coordinate point. In Step S14, a feature recognition module 14 recognizes the traffic lane boundaries, the traffic lane markings, and other vehicles according to the coordinate information and designates them on the aerial view. In Step S16, a lane center calculation module 15 calculates a lane center according to the traffic lane boundaries and the traffic lane markings, which have been designated on the aerial view; next the lane center calculation module 15 finds out a front vehicle from the vehicles according to the lane center and the position of the host vehicle; then the lane center calculation module 15 calculates the speed of the front vehicle according to the positions of the front vehicle. In Step S16, the lane center calculation module 15 finds out a driving-allowed region from the traffic lane boundaries and the traffic lane markings in the aerial view and then takes the central point of two neighboring traffic lane markings in the driving-allowed region as the lane center or takes the average of the traffic lane boundaries and the traffic lane markings in the driving-allowed region as the lane center. In Step S18, a front vehicle prediction module 16 works out a predicted route of the front vehicle using a vehicular kinematics model and also predicts the behaviors of the front vehicle, such as going straight or turning. In Step S20, the sensor 12 determines whether there is a front vehicle in advance; if there is a front vehicle, the process proceeds to Step S22. In Step S22, a route planning module 17 determines whether the predicted route of the front vehicle is the same as the driving route of the host vehicle; if the predicted route of the front vehicle is the same as the driving route of the host vehicle, the process proceeds to Step S24. In Step S24, the route planning module 17 takes the front vehicle as a reference point and works out a final route of the host vehicle via jointly combining the positions of the front vehicle and the lane center. If the predicted route of the front vehicle is different from the driving route of the host vehicle or if it is determined in Step S20 that there is no front vehicle, the process proceeds to Step S26. In Step S26, the route planning module 17 takes the traffic lane boundary as a reference line of the route to work out a final route of the host vehicle.

In Step S12, the aerial view module 13 converts the point cloud image into an aerial view with an axis-rotation equation:

$$\begin{cases} x = c_{11}x' + c_{12}y' + c_{13}z' + h_1 \\ y = c_{21}x' + c_{22}y' + c_{23}z' + h_2 \\ z = c_{31}x' + c_{32}y' + c_{33}z' + h_3 \end{cases} \quad (1)$$

wherein (x', y', z') are the original coordinates of the point cloud image; (x, y, z) are the coordinates of the aerial view generated by conversion; (cos $\alpha$i, cos $\beta$i, cos $\gamma$i) are denoted as (c1i, c2i, c3i) (i=1, 2, 3); $\alpha$, $\beta$, $\gamma$ are the angles by which the original coordinate system is rotated; (h1, h2, h3) is the position of the new origin in the original coordinate system.

Figure 3:
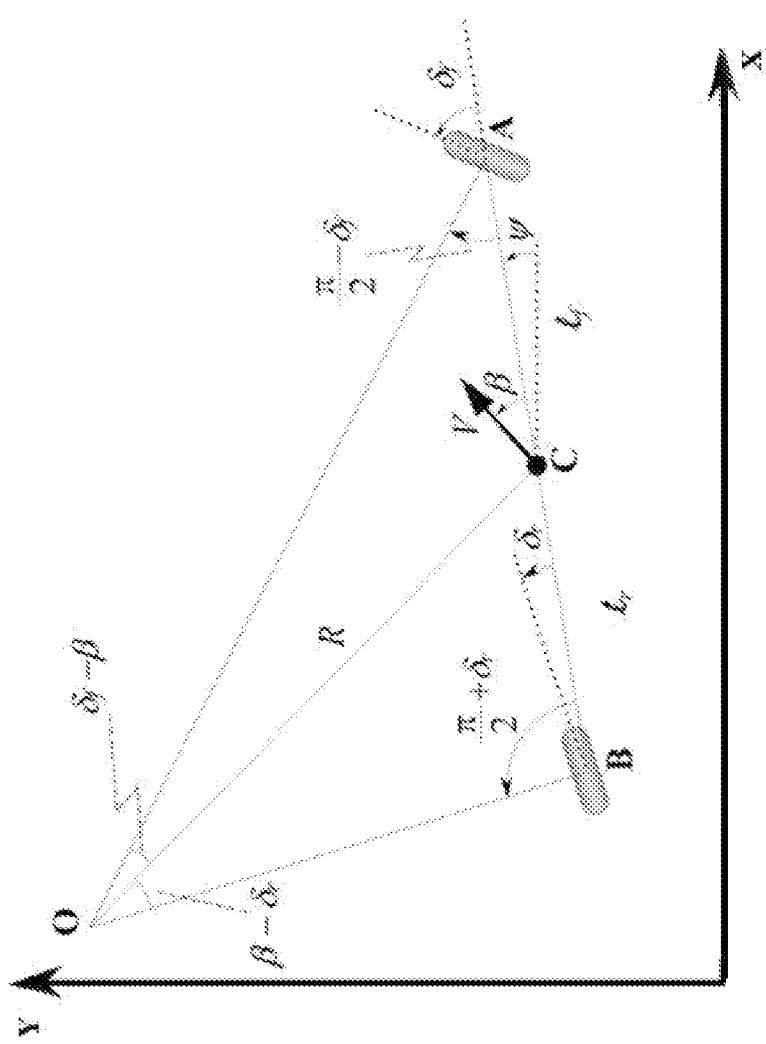
FIG. 3 schematically shows the procedures of calculating a predicted route of a front vehicle on a coordinate system according to one embodiment of the present invention.

In Step S18, the front vehicle prediction module 16 works out a predicted route of the front vehicle using a vehicular kinematics model and also predicts the behaviors of the front vehicle. Refer to FIG. 3, which schematically shows the procedures for calculating the predicted route of the front vehicle on a coordinate system. In FIG. 3, A is the position of the front wheel of a self-driving vehicle model; B is the position of the rear wheel of the self-driving vehicle model; C is the position of the centroid of the self-driving vehicle model; the segment OA and the segment OB are respectively vertical to the abovementioned two wheels; O is the intersection point of OA and OB and also the instantaneous rolling center of the vehicle; $\delta$r is the turning angle of the rear wheel; $\delta$f is the turning angle of the front wheel; Lr is the distance from the rear wheel to the centroid; Lf is the distance from the front wheel to the centroid. The predicted route of the front vehicle may be expressed by Equation (2):

$$\begin{cases} \dot{x}_0 = v \cos(\psi + \beta) \\ \dot{y}_0 = v \sin(\psi + \beta) \\ \dot{\psi} = r \end{cases} \quad (2)$$

wherein $[\dot{x}_0, \dot{y}_0]$ represents a first coordinate point of the front vehicle, $\psi$ is a heading angle; $\beta$ is a slip angle, which is an included angle between the heading direction of the vehicle and the direction that the wheel points to; v is the speed of the vehicle; r is the angular speed of the wheel.

In Step S24, a cubic equation $k(s)=as^3+bs^2+cs+d$ is used to find out the final route of the host vehicle according to Equation (3):

$$r(s) = [x(s), y(s), \theta(s), k(s)]' \quad (3)$$

wherein s is time, x is a coordinate point of the X axis; y is a coordinate point of the Y axis; $\theta$ is a heading angle of the host vehicle; k is the curvature of a corner of an intersection. In the case that there is no front vehicle, the traffic lane boundary may be used to acquire the curvature of the traffic lane, and the following Equations (4)-(8) are substituted into the cubic equation to acquire the equation of the final route, i.e., Equation (3), wherein Equations (4)-(8) are respectively expressed by $$dx/ds = \cos\theta(s) \quad (4)$$

$$dy/ds = \sin\theta(s) \quad (5)$$

$$d\theta/ds = k(s) \quad (6)$$

$$x(s) = \int_0^s \cos\theta(s)ds \quad (7)$$

$$y(s) = \int_0^s \sin\theta(s)ds \quad (8)$$

Figure 5:
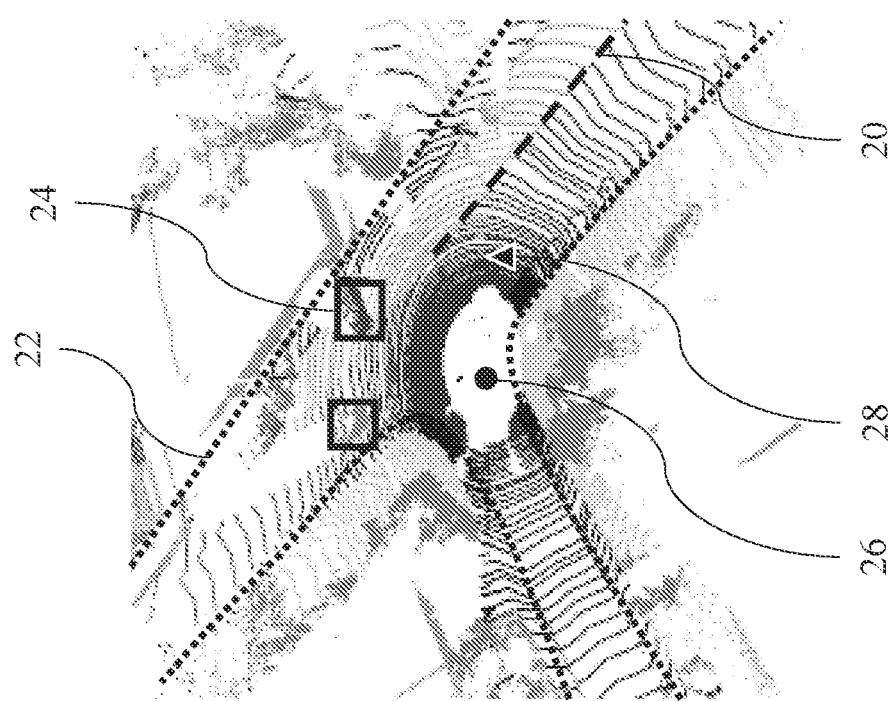
FIGS. 4-6 schematically shows an embodiment where the present invention is used in a T-junction.
Figure 4:
Figure 6:
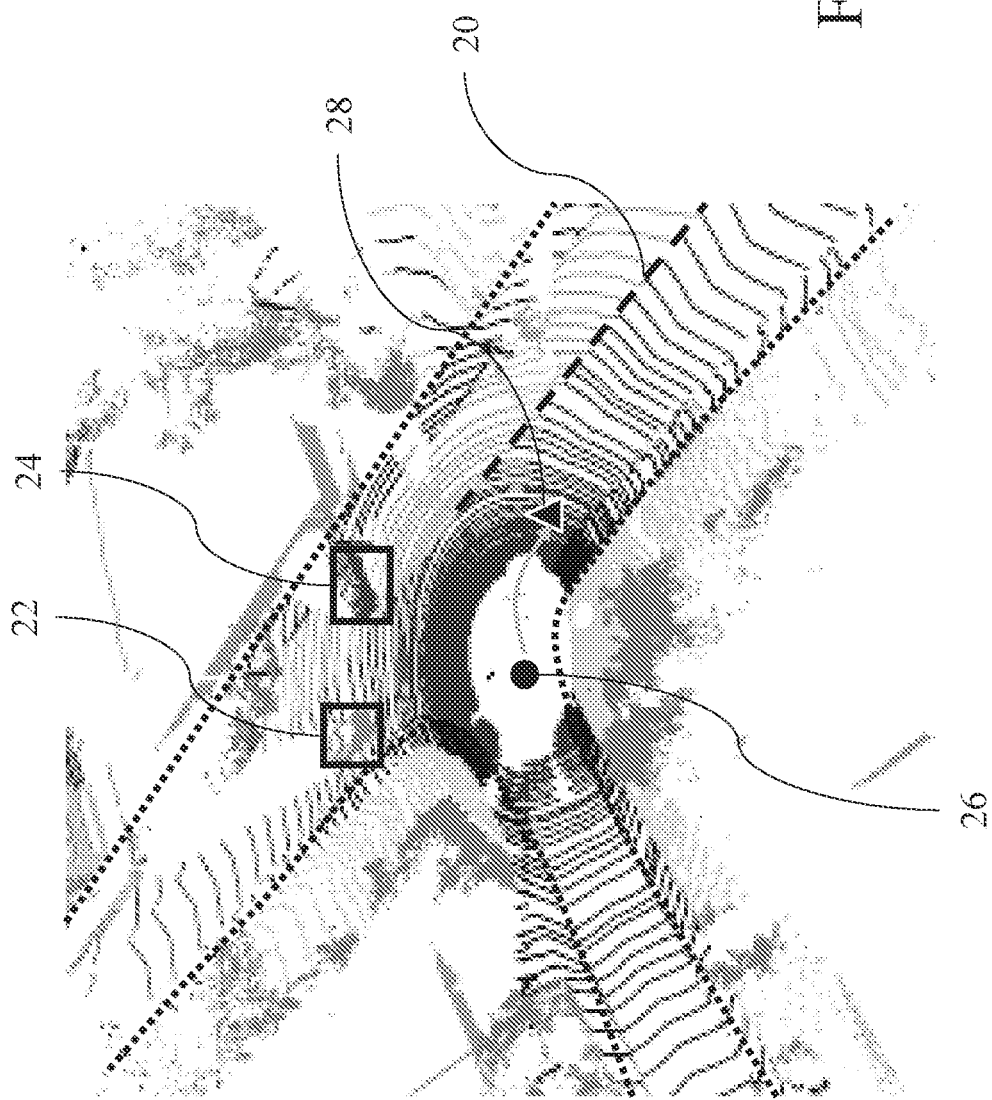

FIGS. 4-6 schematically shows an embodiment where the present invention is used in a T-junction. Suppose that the sensor is a lidar. Firstly, the point cloud image is converted by the axis-rotation equation into the aerial view shown in FIG. 4, wherein the colored image is expressed by a gray-level image. Next, the objects in the environment are recognized according to the intensity values of the return waves to find out the traffic lane markings, the traffic lane boundaries, and all the vehicles, wherein the long-dash line is a traffic lane marking 20, the short-dash lines are traffic lane boundaries 22, the rectangular frame is another vehicle 24, and the dot is the host vehicle 26, as shown in FIG. 5. Next, the middle point of two traffic lane markings 20 or the middle point of one traffic lane marking 20 and one traffic lane boundary 22 is used as the lane center 28, which is denoted by the triangular mark in FIG. 5. It should be noted: the lane center 28 is the first center after the host vehicle 26 passes the T-junction. With the movement of the host vehicle 26, the lane center 28 at different time points t respectively appear at different positions. A plurality of lane centers 28 may be joined to form a traffic lane central line. In FIG. 6, whether there is a front vehicle is determined by detecting whether there is another vehicle appearing in a region before the width of the host vehicle 26. If there is a front vehicle, vehicular kinematics is used to predict the driving behavior of the front vehicle. If there is no front vehicle, the curvature of the nearest traffic lane boundary 22 is used to find out the final route for passing the T-junction. In FIG. 6, the light-gray arc-shaped arrow is the turning route of the host vehicle 26.

Figure 8:
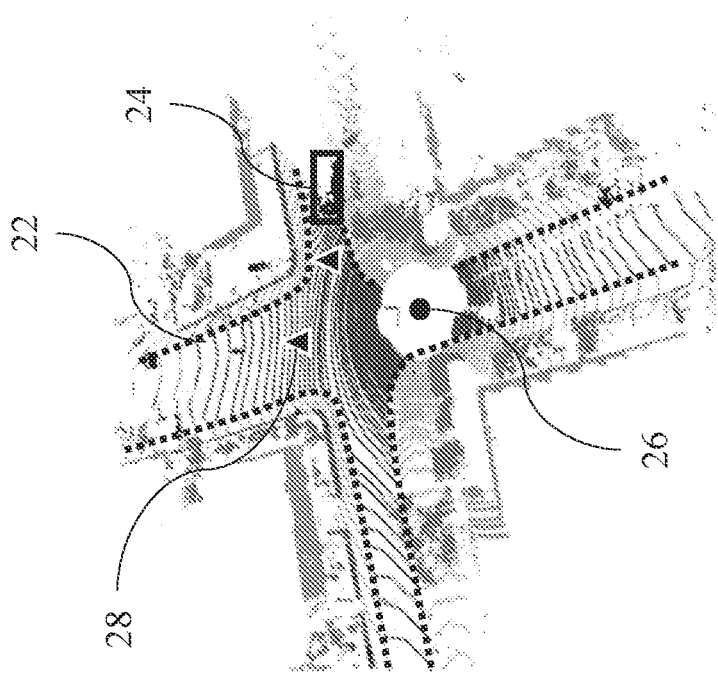
Figure 7:
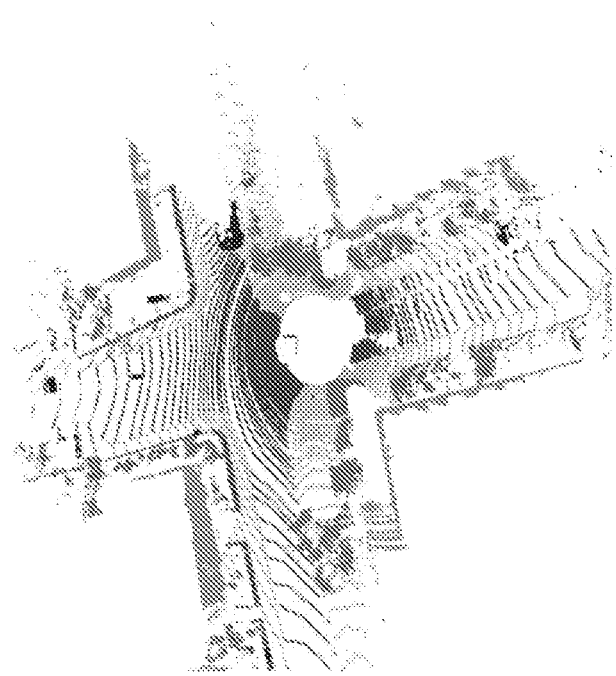

FIGS. 7-9 schematically shows an embodiment where the present invention is used in an intersection. Suppose that the sensor is a lidar. Firstly, the point cloud image is converted by the axis-rotation equation into the aerial view shown in FIG. 7, wherein the colored image is expressed by a gray-level image. Next, the objects in the environment are recognized according to the intensity values of the return waves to find out the traffic lane markings, the traffic lane boundaries, and all the vehicles, wherein the short-dash lines are traffic lane boundaries 22, the rectangular frame is another vehicle 24, and the dot is the host vehicle 26, as shown in FIG. 8. Next, the middle point of two traffic lane boundaries 22 is used as the lane center 28, which is denoted by the triangular mark in FIG. 8. The host vehicle 26 may go straight or turn right. Therefore, the system finds out the lane center 28 for the route of going straight and the lane center 28 for the route of turning right simultaneously, which are denoted by the triangular marks in FIG. 8. Similar to the case in FIG. 6, the lane centers 28 are respectively the first centers of the two routes after the host vehicle 26 passes the intersection. In FIG. 9, whether there is a front vehicle is determined by detecting whether there is another vehicle appearing in a region before the width of the host vehicle 26. If there is a front vehicle, vehicular kinematics is used to predict the driving behavior of the front vehicle. If there is no front vehicle, the curvature of the nearest traffic lane boundary 22 is used to find out the final route for passing the intersection. In FIG. 9, both the light-gray arc-shape arrow and the light-gray straight-line arrow are the routes along which the host vehicle 26 passes the intersection.

Figure 10:
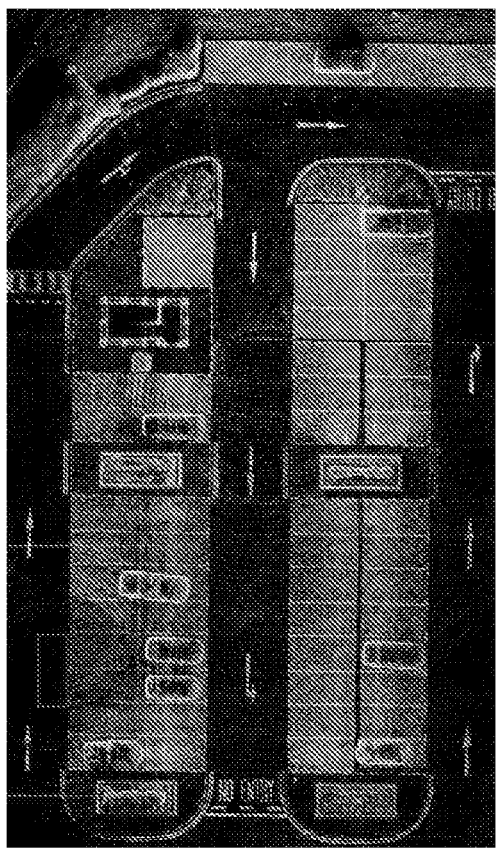
FIGS. 10-12 schematically shows an embodiment where the present invention is used in an underground parking area.
Figure 11:
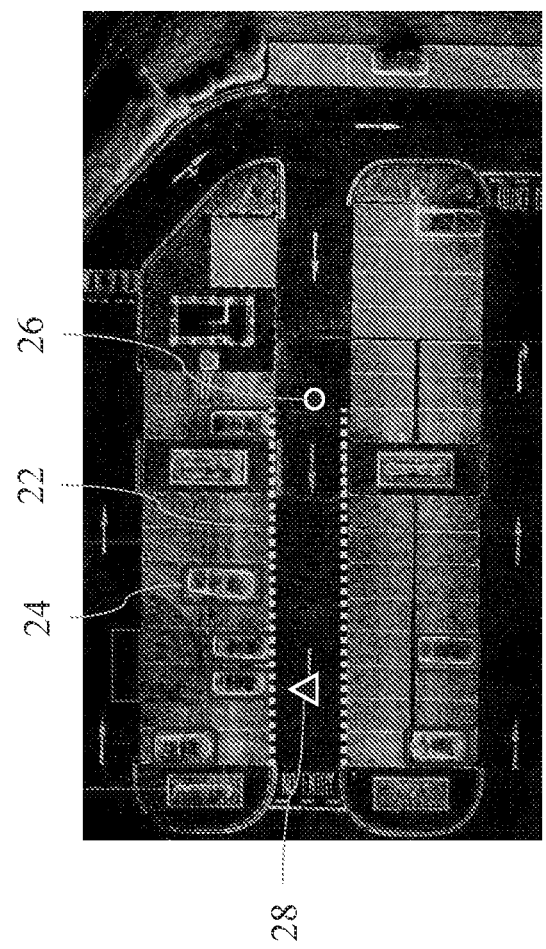
Figure 12:
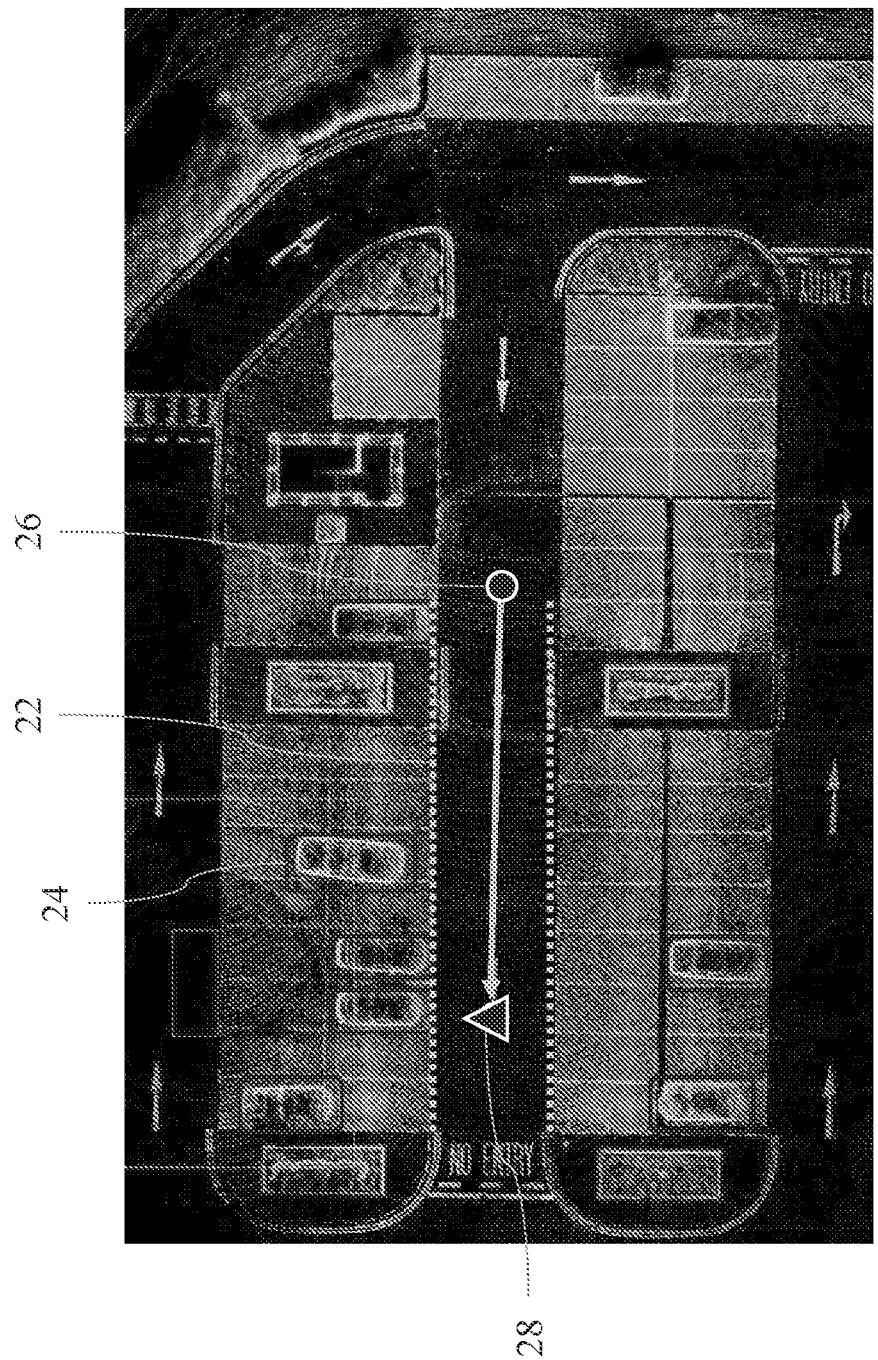

FIGS. 10-12 schematically shows an embodiment where the present invention is used in an underground parking area. Suppose that the sensor is a lidar. Firstly, the point cloud image is converted by the axis-rotation equation into the aerial view shown in FIG. 10, wherein the colored image is expressed by a gray-level image. Next, the objects in the environment are recognized according to the intensity values of the return waves to find out the traffic lane markings, the traffic lane boundaries, and all the vehicles, wherein the short-dash lines are traffic lane boundaries 22, the rectangular frame is another vehicle 24, and the dot is the host vehicle 26, as shown in FIG. 11. Next, the middle point of two traffic lane boundaries 22 is used as the lane center 28, which is denoted by the triangular mark in FIG. 11. In FIG. 12, whether there is a front vehicle is determined via detecting whether there is another vehicle appearing in a region before the width of the host vehicle 26. If there is a front vehicle, vehicular kinematics is used to predict the driving behavior of the front vehicle. If there is no front vehicle, the curvature of the nearest traffic lane boundary 22 is used to find out the final route of the host vehicle 26. In FIG. 12, the light-gray straight-line arrow is the route of the host vehicle 26.

In conclusion, the present invention provides a route planning system and method of a self-driving vehicle, which is characterized in using a conversion equation to convert the point cloud image detected by a lidar into an aerial view; recognizing the objects in the environment to find out the traffic lane markings and the traffic lane boundaries; finding the center point of the lane markings of another traffic lane (such as the traffic lane where the host vehicle will go straight or turn its direction) as the lane center; using the front vehicle as a route reference point of the host vehicle suppose that there is a front vehicle at the lane center and that it is determined that the front vehicle and the host vehicle have the same route; and using the traffic lane boundaries to work out the final route of the host vehicle suppose that there is no front vehicle at the lane center. Thereby, the present invention neither needs the high-definition map information nor needs the GPS positioning system. It is sufficient for the present invention to use the point cloud data of a lidar to work out the final route of the host vehicle. Therefore, the present invention can significantly decrease the money spent in producing the high-definition map information and effectively reduce the storage space occupied by data. Further, the present invention can still work in an underground parking area where the GPS positioning system cannot work.

The embodiments described are only to exemplify the present invention but not to limit the scope of the present invention. Any equivalent modification or variation according to the characteristics and spirit of the present invention is to be also included by the scope of the present invention.

What is claimed is:

1. A route planning system of a self-driving vehicle, installed in a host vehicle and comprising:
    at least one lidar sensor, used to detect environment information of the host vehicle;
    an aerial view generation module, connected with the at least one lidar sensor to receive the environment information and convert the environment information into an aerial view that includes coordinate information of coordinate points;
    a feature recognition module, connected with the aerial view generation module, recognizing traffic lane boundaries, traffic lane markings, and other vehicles according to the coordinate information, and marking the traffic lane boundaries, the traffic lane markings, and the other vehicles;
    a lane center calculation module, connected with the feature recognition module, working out a driving-allowed region and a lane center according to the traffic lane boundaries and the traffic lane markings marked on the aerial view, finding out a front vehicle from the other vehicles according to the lane center and a position of the host vehicle, and calculating a speed of the front vehicle according to a position of the front vehicle;
    a front vehicle prediction module, connected with the feature recognition module and the lane center calculation module, and working out a predicted route of the front vehicle according to a vehicular kinematics model; and
    a route planning module, connected with the front vehicle prediction module, and calculating a final route of the host vehicle via using the front vehicle as a route reference point if the predicted route of the front vehicle is the same as a driving route of the host vehicle or via using the traffic lane boundary as a route reference line if the predicted route of the front vehicle is different from the driving route of the host vehicle or if there is no front vehicle,
    wherein the coordinate information includes intensity values of return waves of the coordinate points, and
    wherein the feature recognition module performs a filtering operation on the coordinate information to filter out noise signals and recognizes the traffic lane boundaries, the traffic lane markings, and the other vehicles in the aerial view according to the intensity values of return waves of the coordinate information.

2. The route planning system of a self-driving vehicle according to claim 1, wherein the at least one lidar sensor presents the environment information in a point cloud image;
    the aerial view generation module uses an axis-rotation equation to convert the environment information into the aerial view.

3. The route planning system of a self-driving vehicle according to claim 1, wherein the intensity values of the return waves are divided into a plurality of ranges in advance; the coordinate points in different ranges of the intensity values of the return waves are presented with different colors in the aerial view.

4. The route planning system of a self-driving vehicle according to claim 1, wherein the feature recognition module uses a Kalman filter to perform the filtering operation on the coordinate information.

5. The route planning system of a self-driving vehicle according to claim 1, wherein the lane center calculation module finds out the driving-allowed region according to the traffic lane boundaries and the traffic lane markings in the aerial view and takes a central point of two neighboring traffic lane markings in the driving-allowed region as the lane center or takes an average of the traffic lane boundaries and the traffic lane markings in the driving-allowed region as the lane center.

6. The route planning system of a self-driving vehicle according to claim 1, wherein after acquiring the positions of the front vehicle, the lane center calculation module works out the speed of the front vehicle according to the positions of the front vehicle in at least two successive aerial views.

7. The route planning system of a self-driving vehicle according to claim 6, wherein the front vehicle prediction module establishes a region of interest (ROI) of driving behaviors and predicts behaviors of the front vehicle, including going straight or turning, according to the predicted route and the ROI of driving behaviors.

8. The route planning system of a self-driving vehicle according to claim 1, wherein while the predicted route of the front vehicle is the same as the driving route of the host vehicle, the route planning module takes the front vehicle as the route reference point and combines the position of the host vehicle, the lane center, and the speed of the front vehicle to calculate the final route of the host vehicle.

9. The route planning system of a self-driving vehicle according to claim 1, wherein while the predicted route of the front vehicle is different from the driving route of the host vehicle, the route planning module takes the traffic lane boundary as the route reference line, uses the route reference line to calculate a boundary curvature, and then works out the final route of the host vehicle.

10. A route planning method of a self-driving vehicle, comprising steps:
   detecting environment information of a host vehicle by at least one lidar sensor;
   converting the environment information into an aerial view, wherein the aerial view includes coordinate information of each coordinate point;
   recognizing traffic lane boundaries, traffic lane markings, and other vehicles in the aerial view according to the coordinate information and designating the traffic lane boundaries, the traffic lane markings, and the other vehicles on the aerial view;
   calculating a lane center according to the traffic lane boundaries and the traffic lane markings, which have been designated on the aerial view, finding out a front vehicle from the other vehicles according to the lane center and the position of the host vehicle, and calculating a speed of the front vehicle according to the positions of the front vehicle;
   working out a predicted route of the front vehicle according to a vehicular kinematics model; and
   calculating a final route of the host vehicle via taking the front vehicle as a route reference point if the predicted route of the front vehicle is the same as a driving route of the host vehicle, or via taking the traffic lane boundary as a route reference line if the predicted route of the front vehicle is different from the driving route of the host vehicle,
wherein the coordinate information includes intensity values of return waves of the coordinate points, and
wherein a filtering operation is performed on the coordinate information to filter out noise signals and the traffic lane boundaries, the traffic lane markings, and the other vehicles in the aerial view are recognized according to the intensity values of return waves of the coordinate information.

11. The route planning method of a self-driving vehicle according to claim 10, wherein the environment information is presented in a point cloud image; an axis-rotation equation is used to convert the environment information into the aerial view.

12. The route planning method of a self-driving vehicle according to claim 10, wherein the intensity values of the return waves are divided into a plurality of ranges in advance; the coordinate points in different ranges of the intensity values of the return waves are presented with different colors in the aerial view.

13. The route planning method of a self-driving vehicle according to claim 10, wherein a Kalman filter is used to perform the filtering operation on the coordinate information.

14. The route planning method of a self-driving vehicle according to claim 10, wherein the step of calculating the lane center further includes steps:
   finding out a driving-allowed region according to the traffic lane boundaries and the traffic lane markings in the aerial view; and
   taking a central point of two neighboring traffic lane markings as the lane center or takes an average of the traffic lane boundaries and the traffic lane markings as the lane center.

15. The route planning method of a self-driving vehicle according to claim 10, wherein the step of calculating the speed of the front vehicle according to the positions of the front vehicle further includes a step:
   working out the speed of the front vehicle according to the positions of the front vehicle in at least two successive aerial views.

16. The route planning method of a self-driving vehicle according to claim 10, wherein the step of working out a predicted route of the front vehicle according to a vehicular kinematics model further includes a step:
   establishing a region of interest (ROI) of driving behaviors and predicting behaviors of the front vehicle, including going straight or turning, according to the predicted route and the ROI of driving behaviors.

17. The route planning method of a self-driving vehicle according to claim 10, wherein while the predicted route of the front vehicle is the same as the driving route of the host vehicle, the front vehicle is taken as the route reference point; the route reference point, the position of the host vehicle, the lane center, the speed of the front vehicle are used to calculate the final route of the host vehicle.

18. The route planning method of a self-driving vehicle according to claim 10, wherein while the predicted route of the front vehicle is different from the driving route of the host vehicle, the traffic lane boundary is taken as the route reference line; the route reference line is used to calculate a boundary curvature; the boundary curvature are used to work out the final route of the host vehicle.

* * * * *